(12) United States Patent
Bravo Orellana et al.

(10) Patent No.: US 11,474,243 B2
(45) Date of Patent: Oct. 18, 2022

(54) SELF-CALIBRATING SENSOR SYSTEM FOR A WHEELED VEHICLE

(71) Applicant: DIBOTICS, Versailles (FR)

(72) Inventors: Raul Bravo Orellana, Paris (FR); Olivier Garcia, Paris (FR)

(73) Assignee: OUTSIGHT, Paris (FR)

( * ) Notice: Subject to any disclaimer, the term of this patent is extended or adjusted under 35 U.S.C. 154(b) by 847 days.

(21) Appl. No.: 16/344,373

(22) PCT Filed: Nov. 17, 2017

(86) PCT No.: PCT/EP2017/079663
§ 371 (c)(1),
(2) Date: Apr. 24, 2019

(87) PCT Pub. No.: WO2018/091685
PCT Pub. Date: May 24, 2018

(65) Prior Publication Data
US 2019/0257949 A1    Aug. 22, 2019

(30) Foreign Application Priority Data
Nov. 18, 2016    (EP) ..................................... 16306516

(51) Int. Cl.
*G01S 13/06*    (2006.01)
*G01S 17/42*    (2006.01)
(Continued)

(52) U.S. Cl.
CPC .............. *G01S 17/42* (2013.01); *G01S 13/60* (2013.01); *G01S 17/48* (2013.01); *G01S 17/58* (2013.01); *G01S 17/66* (2013.01); *G06T 17/05* (2013.01)

(58) Field of Classification Search
CPC .......... G01S 17/42; G01S 13/60; G01S 17/48; G01S 17/58; G01S 17/66; G06T 17/05
See application file for complete search history.

(56) References Cited

U.S. PATENT DOCUMENTS

| 9,945,950 B2 | 4/2018 | Newman et al. |
| 2011/0054793 A1* | 3/2011 | Harada ............ G08G 1/096725 |
| | | 701/301 |

(Continued)

FOREIGN PATENT DOCUMENTS

WO    2013/150286 A1    10/2013

OTHER PUBLICATIONS

Besl et al., "A method for registration of 3-d shapes", IEEE Transactions on Pattern Analysis and Machine Intelligence, 1992, pp. 239-256, vol. 14, No. 2.

(Continued)

*Primary Examiner* — Adam M Alharbi
(74) *Attorney, Agent, or Firm* — Nixon & Vanderhye (57) ABSTRACT

Disclosed is a method and a system for retrieving a location of a base point of a wheeled vehicle in a local coordinate system of a tridimensional sensor mounted on the vehicle. The method includes acquiring point cloud frames while the wheeled vehicle is moving along a straight path and a curved path and a point cloud representative of a portion of the vehicle, computing a main direction vector, a main direction line and a location of an instantaneous centre of rotation of the wheeled vehicle in the local coordinate system, and retrieving the location of the base point.

20 Claims, 3 Drawing Sheets

(51) Int. Cl.
*G01S 17/48* (2006.01)
*G01S 17/58* (2006.01)
*G01S 17/66* (2006.01)
*G06T 17/05* (2011.01)
*G01S 13/60* (2006.01)

(56) References Cited

U.S. PATENT DOCUMENTS

| | | | |
|---|---|---|---|
| 2012/0209489 A1* | 8/2012 | Saito | B60W 50/0097 |
| | | | 701/70 |
| 2013/0060415 A1 | 3/2013 | Pfaff et al. | |
| 2015/0062595 A1 | 3/2015 | Garcia et al. | |

OTHER PUBLICATIONS

Chen et al., "Object Modeling by Registration of Multiple Range Images", Proceedings of the 1991 IEEE International Conference on Robotics and Automation, 1991, pp. 2724-2729.
International Search Report and Written Opinion, dated Mar. 1, 2018, from corresponding PCT application No. PCT/EP2017/079663.
European Search Report, dated May 18, 2017, from corresponding EP application No. 16306516.

* cited by examiner

SELF-CALIBRATING SENSOR SYSTEM FOR A WHEELED VEHICLE

FIELD OF THE INVENTION

The instant invention relates to methods for retrieving a location of a base point of a wheeled vehicle, to self-calibrating sensor system for a wheeled vehicle and to self-driving vehicles comprising such self-calibrating sensor systems.

BACKGROUND OF THE INVENTION

The present application belong the field of tridimensional sensors that are mounted on a wheeled vehicle.

Providing a vehicle with tridimensional sensors that are able to acquire tridimensional point clouds of the surroundings of the vehicle has many interesting applications.

The acquired point clouds may for instance be used to generate 3D maps of an area travelled by the vehicle.

The acquired point clouds may also be used to assist or to automate the driving of the vehicle.

Examples of applications for driving assistance are object detection to trigger collision warning or collision avoidance but the sensors may also be used in a fully autonomous vehicle, in order to automate the driving of the vehicle.

To perform effectively, the tridimensional sensor must be aligned and located with a high accuracy with regard to the vehicle. Otherwise, the operation of the sensor may present significant risk for the passengers of the vehicle and other road-users. For instance, if the sensor detects an object that is in the path of the host vehicle but, due to a misalignment, considers that the object is slightly to the left of the path of the wheeled vehicle, the wheeled vehicle may be unaware of a serious risk situation.

When there are several sensors, it is also important to be able to fuse the acquired data in a common reference system to make decisions. The sensors then need to be aligned properly to minimize conflicting sensor information.

Traditional approaches for three-dimensional sensor acquisition on wheeled vehicle rely on carefully machined carrier plate to position the sensor in a controlled location and alignment with regard to the vehicle or to factory calibration to determine a coordinate transfer function from a local coordinate system of the sensor acquisition to a vehicle reference frame system.

Those approaches require expensive machining. Moreover, if a sensor becomes misaligned with the vehicle's reference frame, due to shock, age or weather-related conditions, there are usually no easy way to correct the misalignment, other than to replace the mounting stage with the sensor or to bring back the vehicle to a factory for recalibration since the calibration process of these sensors involves 3D measurement tools and 3D input interface that are not available in a car workshop.

The present invention aims at improving this situation.

To this aim, a first object of the invention is a method for retrieving a location of a base point of a wheeled vehicle in a local coordinate system of a tridimensional sensor mounted on said vehicle, the method comprising:

acquiring a succession of first point cloud frames of an environment of the vehicle by operating said sensor while the wheeled vehicle is moving along a straight path, acquiring a succession of second point cloud frames of the environment of the vehicle by operating said sensor while the wheeled vehicle is moving along a curved path, providing at least one third point cloud acquired by said sensor and representative of a portion of the vehicle, said first point cloud frames, said second point cloud frames and said at least one third point cloud are provided in a local coordinate system of the tridimensional sensor, computing a main direction vector of the wheeled vehicle in the local coordinate system of the sensor from the succession of first point cloud frames, defining a main direction line of the wheeled vehicle in the local coordinate system of the sensor from the main direction vector and the third point cloud, determining at least one location of an instantaneous centre of rotation of the wheeled vehicle moving along the curved path, in the local coordinate system of the sensor, from the succession of second point cloud frames, retrieving location of a base point of a wheeled vehicle in the local coordinate system using the main direction line and the location of the instantaneous centre of rotation.

In some embodiments, one might also use one or more of the following features:

the location of the base point of the wheeled vehicle is computed, in the local coordinate system of the sensor, by finding a point of the main direction line with minimal distance to the instantaneous centre of rotation;

the location of the base point of the wheeled vehicle, in the local coordinate system of the sensor, is such that a line connecting said base point to the instantaneous centre of rotation is perpendicular to the main direction line;

the portion of the vehicle represented by the at least one third point cloud extends on similar distances on either side of a symmetrical plane of the wheeled vehicle;

the at least one tridimensional sensor is mounted on or above a roof of said vehicle and said portion of the vehicle represented by the at least one third point cloud comprises at least a portion of a left lateral edge of said roof and at least a portion of a right lateral edge of said roof, said left lateral edge and right lateral edge of said roof being defined with regard to a symmetrical plane of the wheeled vehicle;

said at least one third point cloud representative of a portion of the vehicle is provided by comparing at least two point clouds among the first point cloud frames and the second point cloud frames, in order to segment points of said at least two point clouds into data points representative of an environment of the vehicle and data points representative of the vehicle, said at least one third point cloud being comprised of said data points representative of the vehicle;

the step of determining a main direction line of the wheeled vehicle in the local coordinate system of the sensor from the main direction vector and the third point cloud, comprises determining a location, in the local coordinate system, of at least one middle point located on a symmetry plane of the wheeled vehicle from the third point cloud, and determining the main direction line of the wheeled vehicle in the local coordinate system of the sensor from the main direction vector and the location of said at least one middle point;

the location of said middle point is determined by computing a centroid of the third point cloud;

the location of said middle point is determined by projecting the third point cloud on a plane perpendicular to the main direction vector and determining a centre of said projection of the third point cloud;

at least one point cloud among the first point cloud frames, the second point cloud frames and the third point cloud is determined by fusing at least two point clouds respectively acquired by at least two tridimensional sensors mounted on said vehicle.

the method further comprises determining a body frame coordinate system of the wheeled vehicle defined by
the base point of the wheeled vehicle, and
at least one axis of the body frame coordinate system determined from the main direction vector and the instantaneous centre of rotation, preferably at least two axes, more preferably three axes.

Another object of the invention is a method for registering a point cloud frame acquired by at least one tridimensional sensor mounted on a wheeled vehicle to a body frame coordinate system of the wheeled vehicle, said method comprising:

receiving a plurality of point cloud frames from said at least one tridimensional sensor, in a local coordinate system of said sensor, retrieving a body frame coordinate system of the wheeled vehicle by performing a method as detailed above using said plurality of point cloud frames, registering at least one point cloud frame acquired by said sensor in said local coordinate system of said sensor to said body frame coordinate system of the wheeled vehicle.

Another object of the invention is a self-calibrating tridimensional sensor system for a wheeled vehicle, comprising:

at least one tridimensional sensor adapted to be mounted on a wheeled vehicle to acquire point cloud frames of an environment of the vehicle and at least a portion of the vehicle, a processing unit connected to said at least one tridimensional sensor and operational to
receive point cloud frames from said at least one tridimensional sensor, and
retrieve a location of a base point of a wheeled vehicle in a local coordinate system of the tridimensional sensor by operating a method as detailed above, and/or register at least one of said point cloud frames to a body frame coordinate system of the wheeled vehicle by operating a method according to claim 11.

Another object of the invention is an autonomous or semiautonomous wheeled vehicle comprising a self-calibrating tridimensional sensor system as detailed above.

Yet another object of the invention is a non-transitory computer readable storage medium, having stored thereon a computer program comprising program instructions, the computer program being loadable into a processing unit of a self-calibrating tridimensional sensor system as detailed above or a method as detailed above, when the computer program is run by the processing unit.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 1:
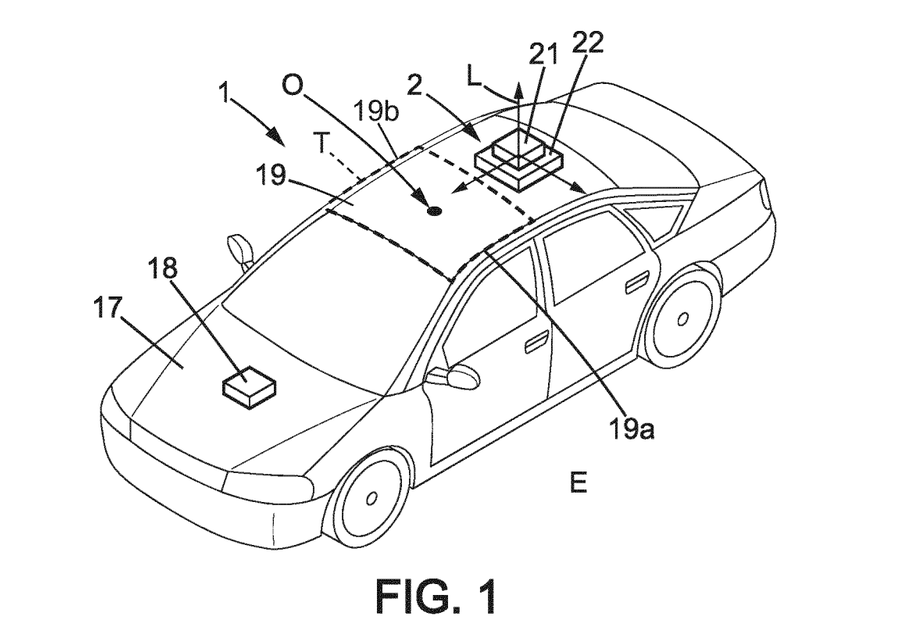
FIG. 1 is a schematic perspective view of a wheeled vehicle comprising a self-calibrating tridimensional sensor system according to an embodiment of the invention.

FIG. 1 illustrates a wheeled vehicle 1 according to one embodiment of the invention.

The vehicle 1 is a wheeled vehicle whose direction can be controlled to follow a specific path. One example of special interest is a car provided with a steering mechanism, for instance a front-wheel-steering vehicle as illustrated on FIG. 1. It should be noted that the invention can be applied to a wide range of wheeled vehicles, rear-wheel-steering car, trucks, motorcycles and the like. In the most general case, the wheeled vehicle 10 is provided with a chassis 10 bearing at least one wheel 12.

In the example of FIG. 1, the vehicle 1 is a front-wheel-steering (FWS) vehicle provided with a chassis 10 connecting a front axle 11 provided with two steerable wheels 12, 13 and a rear axle 14 provided with two non-steerable wheels 15, 16.

The vehicle 1 usually comprises a body 17 delimiting an inside I of the vehicle from an environment E of the vehicle 1.

A plurality of sensors of the vehicle 1 may be mounted on or inside the body 17 of the vehicle 1.

In particular, the vehicle 1 according to the invention is provided with a self-calibrating tridimensional sensor system 2 able to output point cloud frames of the environment E of the vehicle 1.

The sensor system 2 is mounted and secured on, or inside, the vehicle.

The sensor system may be able to send data to an internal processing unit 18 of the vehicle 1 and/or to send data to a remote server (not illustrated).

The self-calibrating tridimensional sensor system 2 comprises at least one tridimensional sensor 21 adapted to be mounted on the wheeled vehicle 1. The tridimensional sensor 21 is able to acquire point clouds and point cloud frames of the environment E of the vehicle 1 and of at least a portion of the vehicle 1, as it will detail further below.

By "point cloud", we mean a set of tridimensional data points in a coordinate system, for instance a local coordinate system L of said sensor as detailed below. Each of data point of the point cloud corresponds to a point of a surface of an object located in a volume surrounding the sensor 21.

By a "tridimensional data point", it is understood three-dimensional coordinates of a point of the environment of the sensor in a coordinate system, for instance a local coordinate system L of said sensor as detailed below. A tridimensional data point may further comprise additional characteristics, for instance the intensity of the signal detected by the sensor at said point.

By "point cloud frame", it is meant a point cloud associated to an index in a succession of point clouds, for instance a timestamp indicative of a time of acquisition of the point cloud during a series of acquisitions. A succession of point cloud frames may thus be organized in a timeline of data frame acquisitions.

The point cloud may in particular be acquired in a local coordinate system L of said sensor 21.

The local coordinate system L is a coordinate system L related to said sensor 21, for instance with an origin point located at the sensor location. The local coordinate system L may be a cartesian, cylindrical or polar coordinate system.

A tridimensional sensor 21 may for instance comprise a laser rangefinder such as a light detection and ranging (LIDAR) module, a radar module, an ultrasonic ranging module, a sonar module, a ranging module using triangulation or any other device able to acquire the position of a single or a plurality of points P of the environment in a local coordinate system L of the sensor 21.

In a preferred embodiment, a tridimensional sensor emits an initial physical signal and receives a reflected physical signal along controlled direction of the local coordinate system. The emitted and reflected physical signals can be for instance light beams, electromagnetic waves or acoustic waves.

The sensor 21 then computes a range, corresponding to a distance from the sensor 21 to a point P of reflection of the initial signal on a surface of an object located in a volume surrounding the sensor 21. Said range may be computed by comparing the initial signal and the reflected signal, for instance by comparing the time or the phases of emission and reception.

The coordinates of a tridimensional data point in the local coordinate system of the sensor 21 can then be computed from said range and said controlled direction.

In one example, the sensor 21 comprises a laser emitting light pulses with a constant time rate, said light pulses being deflected by a moving mirror rotating along two directions. Reflected light pulses are collected by the sensor and the time difference between the emitted and the received pulses give the distance of reflecting surfaces of objects in the environment of the sensor 21. A processor of the sensor 21, or a separate processing unit, then transform, using simple trigonometric formulas, each observation acquired by the sensor into a three-dimensional data point D.

A point cloud comprising a full scan of the local environment of sensor 21 is periodically acquired and comprises a set of tridimensional data points D representative of the objects in the volume surrounding the sensor 21.

By "full scan of the local environment", it is meant that the sensor 21 has covered a complete field of view. For instance, after a full scan of the local environment, the moving mirror of a laser-based sensor is back to an original position and ready to start a new period of rotational movement. A full scan of the local environment by the sensor is thus the three-dimensional equivalent of an image acquired by a bi-dimensional camera.

A set of tridimensional data points D acquired in a full scan of the local environment of sensor 21 is a point cloud. The sensor 21 is able to periodically acquire point clouds frames with a given framerate.

The self-calibrating tridimensional sensor system 2 further comprises a processing unit 22 connected to said at least one tridimensional sensor 21.

The processing unit 22 is able to receive point clouds and point cloud frames from said sensor 21. The processing unit 22 can be integrated with the sensor 21 in a single unit or alternatively, can be a distinct unit inside secured to the vehicle 1. In some embodiments, the processing unit 22 may be a part of the internal processing unit 18 of the vehicle 1.

The processing unit 22 is able to process the point clouds and point cloud frames received from said sensor 21 to retrieving a location of a base point B of the wheeled vehicle 1 in the local coordinate system L of the tridimensional sensor 21.

A method for retrieving the location of said base point B of the wheeled vehicle 1 according to an embodiment of the invention, using a self-calibrating tridimensional sensor system 2 is illustrated on FIG. 5 and will now be described in further details.

In general, a "base point" of a wheeled vehicle can be defined as follow.

A wheeled vehicle according to the invention has a symmetrical plan S which is perpendicular to the axis of the wheels of the vehicle when said wheels are all aligned. The symmetrical plan S is for instance a central vertical longitudinal plane of a car. In the case of a motorcycle, the vertical longitudinal plane would be a vertical plane passing through the middle of both wheels when said wheels are aligned.

Figure 2:
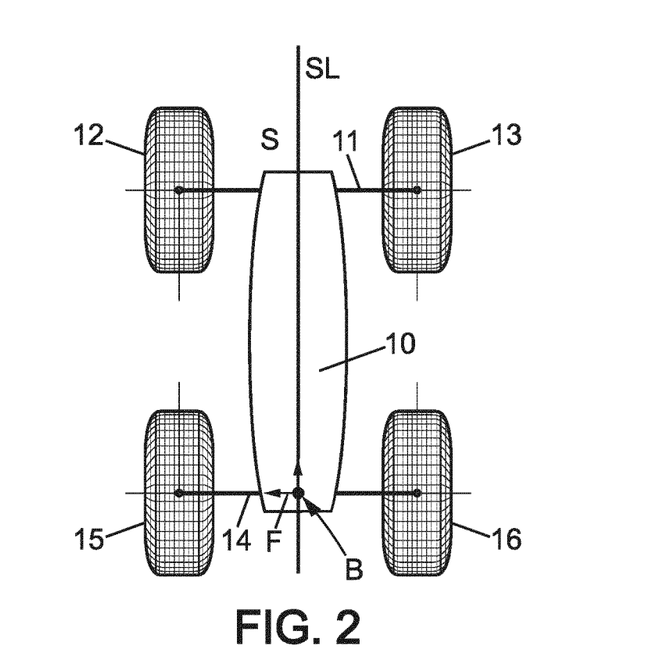
FIG. 2 is a schematic top view of the wheeled vehicle of FIG. 1 following a straight path where the body of the vehicle is hidden to show the wheels.

When the vehicle is driving along a curved path CL as illustrated on FIG. 2, the wheels of the vehicle follow respective paths P1, P2, P3, P4 that are usually different. At each time, each one of said paths P1, P2, P3, P4 can be locally approximated by an instantaneous circle around a so-called instantaneous centre of rotation. Under the Ackerman steering condition in particular, the instantaneous centres of rotation for said paths P1, P2, P3, P4 coincide in an instantaneous centre of rotation R of the vehicle 1.

The base point B of the wheeled vehicle can then be identified as the unique point of the symmetrical plan S of the vehicle 1 with minimal distance to the instantaneous centre of rotation R of the vehicle 1.

Figure 3:
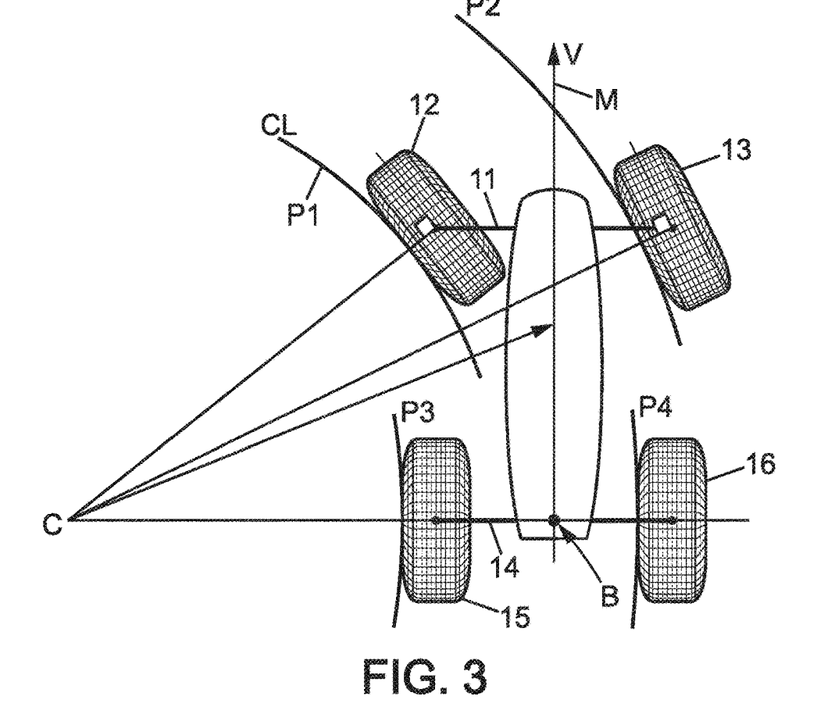
FIG. 3 is a schematic top view of the wheeled vehicle of FIG. 2 following a curved path.

When the vehicle comprises a non-steerable axle, for instance the rear axle in the case of the front-wheel-steering vehicle 1 of FIG. 1, the base point B of the wheeled vehicle 1 is located at the centre of said non-steerable axle as illustrated on FIGS. 2, 3.

Figure 4A:
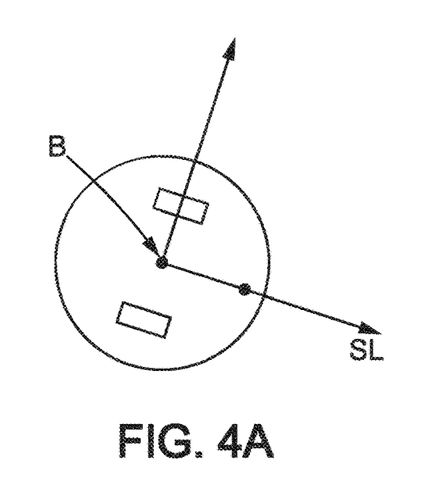
FIGS. 4A, 4B and 4C illustrates alternative configurations of the wheeled vehicle of FIG. 1 comprising a self-calibrating tridimensional sensor system according to an embodiment of the invention.
Figure 4B:
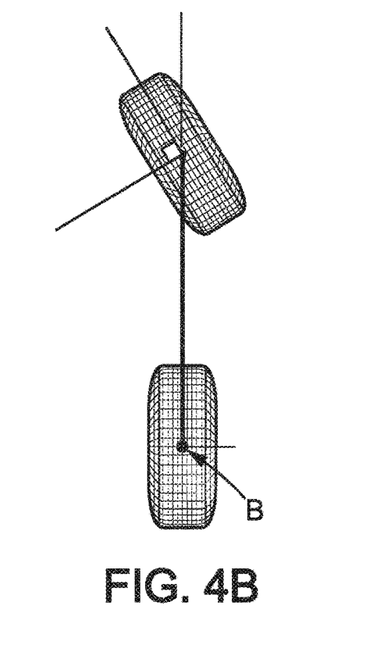
Figure 4C:
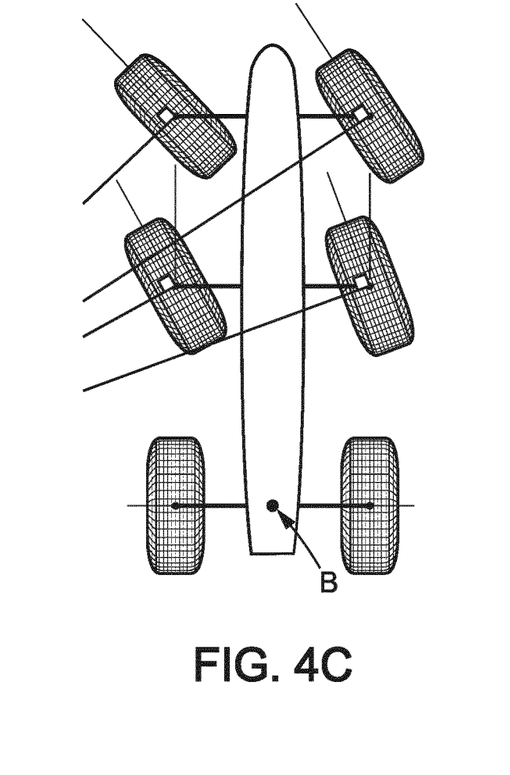

A base point B of the wheeled vehicle 1 is illustrated on FIGS. 4A, 4B and 4C in the cases of various embodiments of wheeled vehicles according to the invention.

Knowing the location of the base point of a wheeled vehicle offers many advantages. In particular, it provides a way to merge data from various sensors with regard to a common and reliable reference point of the vehicle.

One objective of the present invention is to provide a simple, automatic and efficient way to retrieve the location of the base point B of a wheeled vehicle 1 in the local coordinates of a three-dimensional sensor.

Figure 5:
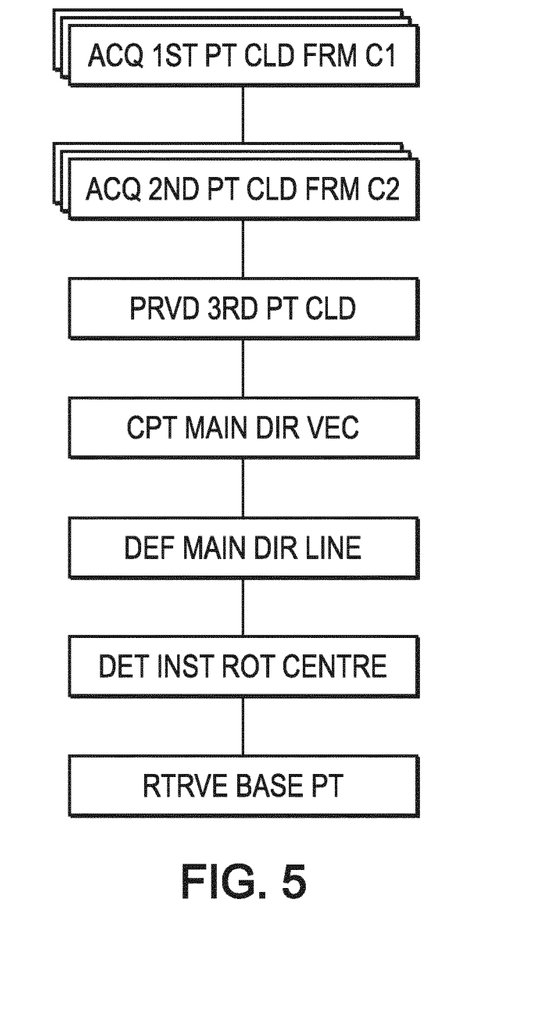
FIG. 5 is a flowchart detailing a method for retrieving a location of a base point of a wheeled vehicle according to embodiments of the invention.

Such a method according to the invention is detailed on FIG. 5.

In a first step, a succession of first point cloud frames C1 of the environment E of the vehicle 1 is acquired by operating said sensor 21 while the wheeled vehicle 1 is moving along a straight path SL as illustrated on FIG. 2.

The first point cloud frames C1 are acquired in the local coordinate system L of the tridimensional sensor 21 as detailed above.

The succession of first point cloud frames C1 comprises a set of point clouds $\{C1_1, \ldots, C1_N\}$ associated with a set of timestamps of respective times of acquisitions $\{t1_1, \ldots, t1_N\}$.

The first point cloud frames C1 are processed by the processing unit 22 in order to compute a main direction vector V of the wheeled vehicle 1 in the local coordinate system L of the sensor 21.

The main direction vector V of the wheeled vehicle is a three-dimensional (or bi-dimensional if the point cloud are projected on a horizontal plan) vector.

It should be noted that the main direction vector V is a vector and as such only contain an indication of an orientation of the vehicle 1 in the local coordinate system L of the tridimensional sensor 21 but is not sufficient to locate the base point B of the symmetrical plan S in said coordinate system L.

As mentioned above, each point cloud acquired by the tridimensional sensor 21 may comprise data points DP_E representative of points P_E of the environment E of the vehicle 1 but also data points DP_V representative of points P_V of the vehicle 1. For instance, if the sensor 21 is mounted on a roof of the vehicle 1, a point cloud acquired by the sensor 21 may capture some points of the roof of the vehicle.

If the case of the first point cloud frames C1, we are more specifically interested in the data points DP_E representative of the environment E of the vehicle 1.

To determine the main direction vector V, the first point cloud frames C1 may thus be segmented to respectively identify and flag data points DP_E representative of the environment E and data points DP_V representative of the vehicle 1 it-self. This segmentation may be performed by comparing successive first point cloud frames C1 together in order to identify stationary points or region of the point clouds. Once the point cloud frames C1 has been segmented, data points DP_V representative of the vehicle 1 may be disregarded from the first point cloud frames C1.

The main direction vector V is then computed by comparing successive first point cloud frames C1 together in order to compute a direction of movement.

Such a comparison can be performed for instance by using an Iterative Closest Point algorithm (ICP) as detailed by P. J. Besl and N. D. McKay in "*A method for registration of 3-d shapes*" published in IEEE Transactions on Pattern Analysis and Machine Intelligence, 14(2):239-256, 1992 or in "*Object modelling by registration of multiple range images*" by Yang Chen and Gerard Medioni published in Image Vision Comput., 10(3), 1992. An ICP algorithm involves search in transformation space trying to find the set of pair-wise transformations of two frames by optimizing a function defined on transformation space. The variant of ICP involve optimization functions that range from being error metrics like "sum of least square distances" to quality metrics like "image distance" or probabilistic metrics. In this embodiment, the processing unit 22 may thus optimize a function defined on a transformation space of several point clouds among the first point clouds $\{C1_1, \ldots, C1_N\}$ to determine the main direction vector V of the vehicle 1 in the local coordinate system L of the sensor 21.

In another step of the method according to the invention, a succession of second point cloud frames C2 of the environment E of the vehicle 1 is acquired by operating said sensor 21 while the wheeled vehicle 1 is moving along a curved path CL as illustrated on FIG. 3.

Here again, the second point cloud frames C2 are acquired in the local coordinate system L of the tridimensional sensor 21 as detailed above.

The succession of second point cloud frames C2 comprises a set of M point clouds $\{C2_1, \ldots, C2_M\}$ associated with a set of timestamps of respective times of acquisitions $\{t1_1, \ldots, t1_M\}$.

The second point cloud frames C2 are then processed by the processing unit 22 in order to determine at least one location of an instantaneous centre of rotation R of the wheeled vehicle 1 moving along the curved path CL.

The location of an instantaneous centre of rotation R is determined in the local coordinate system L of the sensor 21.

The location of an instantaneous centre of rotation R is expressed as a set of three-dimensional coordinates (or bi-dimensional coordinates if the point cloud are projected on a horizontal plan) of the instantaneous centre of rotation R in the local coordinate system L of said sensor vector.

Here again, since we are more specifically interested in the data points DP_E representative of the environment E of the vehicle 1, the second point cloud frames C2 may be segmented to identify and flag data points DP_E representative of the environment E and data points DP_V representative of the vehicle 1, in particular by comparing successive second point cloud frames C2 together in order to identify stationary points or region of the point clouds. Data points DP_V representative of the vehicle 1 may then be disregarded from the second point cloud frames C2.

In a similar fashion to the computing of the main direction vector V, the location of the instantaneous centre of rotation R may be for instance computed by comparing successive second point cloud frames C2 together in order to compute a direction of movement.

Such a comparison can here again be performed using an Iterative Closest Point algorithm (ICP) as detailed by P. J. Besl and N. D. McKay in "*A method for registration of 3-d shapes*" published in IEEE Transactions on Pattern Analysis and Machine Intelligence, 14(2):239-256, 1992 or in "*Object modelling by registration of multiple range images*" by Yang Chen and Gerard Medioni published in Image Vision Comput., 10(3), 1992. An ICP algorithm involves search in transformation space trying to find the set of pair-wise transformations of two frames by optimizing a function defined on transformation space. The variant of ICP involve optimization functions that range from being error metrics like "sum of least square distances" to quality metrics like "image distance" or probabilistic metrics. In this embodiment, the processing unit 22 may thus optimize a function defined on a transformation space of several point clouds among the second point clouds $\{C2_1, \ldots, C2_M\}$ to determine the location of the instantaneous centre of rotation R of the vehicle 1 in the local coordinate system L of the sensor 21.

In yet another step of the method according to the invention, at least one third point cloud C3 is acquired by operating said sensor 21.

As mentioned above, the third point cloud C3 may comprise data points DP_E representative of the environment E of the vehicle 1 and data points DP_V representative of the vehicle 1.

The above detailed operation of segmenting and flagging data points DP_E representative of the environment E and data points DP_V representative of the vehicle 1 may thus be also performed in the case of the third point cloud C3.

However, unlike the first point cloud frames C1 and the second point cloud frames C2, we are here more particularly interested in the data points DP_V of the vehicle 1 it-self among the third point cloud C3.

Once the third point cloud C3 has been segmented, data points DP_E representative of the environment E of the vehicle 1 may this time be disregarded from the third point cloud C3.

In one embodiment, the third point cloud C3 is generated from at least two point cloud frames among the first point cloud frames C1 and second point cloud frames C2. The third point cloud C3 may for instance be generated by comparing two point cloud frames in order to identify stationary points or region of the point clouds that can thus be flagged as data points DP_V of the vehicle 1 and gathered to generate the third point cloud C3.

The third point cloud C3 is representative of a portion T of the vehicle 1.

An example of such a portion T of the vehicle 1 is illustrated on FIG. 1. The portion T of the vehicle extends on substantially similar distances on either side of the symmetrical plane S of the wheeled vehicle 1.

By "extending on similar distances on either side of the symmetrical plane", it is meant that a maximal distance of the data points of the third point cloud C3 on one side of the symmetrical plan S is close to a maximal distance of the data points of the third point cloud C3 on the other side of the symmetrical plan S. Thus, the centroid of the third point cloud C3 or the mid extension of the third point cloud C3 with regard to the symmetrical plan S lies on or close to the symmetrical plan S.

In the example of FIG. 1, the sensor 21 is mounted on the roof 19 of vehicle 1. In this case, said portion T of the vehicle comprises a portion of said roof 19 and in particular at least a portion of a left lateral edge 19*a* of said roof 19 and at least a portion of a right lateral edge 19*b* of said roof 19. The left lateral edge 19*a* and the right lateral edge 19*b* of the roof are defined with regard to the symmetrical plane S of the wheeled vehicle 1 as illustrated on FIG. 1.

In one embodiment of the invention, the portion T of the vehicle comprises a full width of the roof 19 of the vehicle 1.

Once the third point cloud C3 has been provided, the processing unit 22 can define a main direction line M of the wheeled vehicle 1 in the local coordinate system L of the sensor 21 from the main direction vector V and the third point cloud C3.

In one embodiment, the processing unit 22 determine a lateral position of the main direction vector V, in a plan of the local coordinate system L perpendicular to said main direction vector V, so that the main direction line M is a three-dimensional line oriented along the main direction vector V and passing through a centroid of a projection of the third point cloud C3 on the plan perpendicular to said main direction vector V.

In another embodiment, the processing unit 22 may first determine a three-dimensional location, in the local coordinate system, of a middle point O located on the symmetry plane S of the wheeled vehicle from the third point cloud C3. To this aim, the processing unit 22 may simply determine the location of the centroid of the third point cloud C3 as detailed above.

The main direction line M of the wheeled vehicle 1 may then be determined, in the local coordinate system L, of the sensor 21 as a three-dimensional line oriented along the main direction vector V and passing through said middle point O.

The first and second examples described above are similar with the exception that the centroid of the third point cloud C3 is only computed in two dimensions on the plan perpendicular to said main direction vector V in the former example.

Once the main direction line M of the wheeled vehicle 1 and the location of an instantaneous centre of rotation R of the vehicle 1 have been determined from the acquired point clouds, it is possible to retrieve the location of the base point of the vehicle 1 as illustrated on FIG. 3.

The location of the base point B in the local coordinate system L is obtained by finding a point of the main direction line M having a minimal distance to the instantaneous centre of rotation R.

The location of the base point B in the local coordinate system of the sensor is thus such that a line connecting said base point B to the instantaneous centre of rotation R is perpendicular to the main direction line M.

By looking at the kinematics of the vehicle 1 moving along a curved path as illustrated on FIG. 3, it can be seen that the base point B is thus naturally located on the centre of the non-steering axle (e.g. the rear axle for the front-wheel-steering (FWS) vehicle of FIG. 1).

It should be highlighted that the location of the base point B inside the local coordinate system L of the sensor 21 as been determined simply by recording data along two standard path of the vehicle 1 (a straight path and an arbitrary curved path). The above described retrieval procedure is thus cheap since it does not require any external calibration tool. It can be easily reconducted and even integrated in the acquisition process for continuous recalibration.

The above described process may be used to render the tridimensional sensor system highly resilient to event that may modify the calibration of the sensor system, such as shock or aging.

This method may be easily extended to a tridimensional sensor system 2 comprising two of more tridimensional sensors 21. In this case, the first point cloud frames and/or the second point cloud frames may be determined by fusing point clouds respectively acquired by said two or more tridimensional sensors mounted on said vehicle. Alternatively, a separate base point location may be determined in each local coordinate system of said two or more tridimensional sensors in order to merge the point clouds.

More generally, a body frame coordinate system F of the wheeled vehicle may be determined in the local coordinate system L of the sensor 21 by setting the location of the base point B of the wheeled vehicle as the origin of said body frame coordinate system F of the sensor and defining at least one axis of the body frame coordinate system B on the basis of the main direction vector V and the location of the instantaneous centre of rotation C.

In one example, a first axis X of the body frame coordinate system F may be defined by the main direction vector V, a second axis Y by a vector directed from the base point B to the instantaneous centre of rotation C and a third axis Z as a direction perpendicular to said first and second axis.

One advantage of the body frame coordinate system F is that, even though it can be determined in an autonomous manner by the sensor system 2, it is defined with respect to general kinematic properties of the vehicle, in particular the base point and the main direction vector. Another sensor, in particular another three-dimensional sensor, or a processing unit can thus use such coordinate system in an efficient and reliable manner.

The body frame coordinate system F can thus be used to register the point cloud frames acquired by the sensor 21.

The invention is thus also related to a method for registering a point cloud frame acquired by a tridimensional sensor 21 mounted on the wheeled vehicle 1 to a body frame coordinate system F of the wheeled vehicle 1

This method comprises the step of receiving a plurality of point cloud frames from the tridimensional sensor 21, in a local coordinate system L of the sensor, retrieving a body frame coordinate system F of the wheeled vehicle 1 in the local coordinate system S by performing a method as detailed above, using the plurality of point cloud frames, and registering at least one point cloud frame acquired by the sensor 21 in the local coordinate system L of the sensor to the body frame coordinate system F of the wheeled vehicle 1.

The step of registering is accomplished by applying a coordinate system transformation to the location of the data points of the point cloud.

In particular, a self-calibrating tridimensional sensor system 2 according to the invention may be operative to perform the steps of said method for registering a point cloud frame acquired by a tridimensional sensor.

In one embodiment of the invention of particular interest, the vehicle 1 on which, or in which, the self-calibrating tridimensional sensor system 2 is mounted, is a self-driving vehicle.

In this embodiment, the sensor 21 is able to communicate with the internal processing unit 18 of the vehicle 1 which is in charge of driving the self-driving car.

In some embodiments of the invention, the self-calibrating tridimensional sensor system 2 may comprise a communication unit operational to output at least one registered point cloud frame, for instance to output said registered point cloud frame to the internal processing unit 18 of the vehicle 1. The communication unit may be integrated within the processing unit 22 of system 2.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A method for retrieving a location of a base point of a wheeled vehicle in a local coordinate system of a tridimensional sensor mounted on said vehicle, the method comprising:
acquiring a succession of first point cloud frames of an environment of the vehicle by operating said sensor while the wheeled vehicle is moving along a straight path,
acquiring a succession of second point cloud frames of the environment of the vehicle by operating said sensor while the wheeled vehicle is moving along a curved path,
providing at least one third point cloud acquired by said sensor and representative of a portion of the vehicle,
wherein said first point cloud frames, said second point cloud frames and said at least one third point cloud are provided in a local coordinate system of the tridimensional sensor,
computing a main direction vector of the wheeled vehicle in the local coordinate system of the sensor from the succession of first point cloud frames,
defining a main direction line of the wheeled vehicle in the local coordinate system of the sensor from the main direction vector and the third point cloud,
determining at least one location of an instantaneous centre of rotation of the wheeled vehicle moving along the curved path, in the local coordinate system of the sensor, from the succession of second point cloud frames,
retrieving location of a base point of a wheeled vehicle in the local coordinate system using the main direction line and the location of the instantaneous centre of rotation.

2. The method of claim 1, wherein the location of the base point of the wheeled vehicle is computed, in the local coordinate system of the sensor, by finding a point of the main direction line with minimal distance to the instantaneous centre of rotation.

3. The method of claim 1, wherein the location of the base point (B) of the wheeled vehicle, in the local coordinate system of the sensor, is such that a line connecting said base point to the instantaneous centre of rotation is perpendicular to the main direction line.

4. The method of claim 1, wherein the portion of the vehicle represented by the at least one third point cloud extends on similar distances on either side of a symmetrical plane of the wheeled vehicle.

5. The method of claim 1, wherein the at least one tridimensional sensor is mounted on or above a roof of said vehicle and wherein said portion of the vehicle represented by the at least one third point cloud comprises at least a portion of a left lateral edge of said roof and at least a portion of a right lateral edge of said roof, said left lateral edge and right lateral edge of said roof being defined with regard to a symmetrical plane of the wheeled vehicle.

6. The method of claim 1, wherein said at least one third point cloud representative of a portion of the vehicle is provided by comparing at least two point clouds among the first point cloud frames and the second point cloud frames, in order to segment points of said at least two point clouds into data points representative of an environment of the vehicle and data points representative of the vehicle,
wherein said at least one third point cloud is comprised of said data points representative of the vehicle.

7. The method of claim 1, wherein the step of determining a main direction line of the wheeled vehicle in the local coordinate system of the sensor from the main direction vector and the third point cloud, comprises
determining a location, in the local coordinate system, of at least one middle point located on a symmetry plane of the wheeled vehicle from the third point cloud, and
determining the main direction line of the wheeled vehicle in the local coordinate system of the sensor from the main direction vector and the location of said at least one middle point.

8. The method of claim 7, wherein the location of said middle point is determined by computing a centroid of the third point cloud.

9. The method of claim 7, wherein the location of said middle point is determined by projecting the third point cloud on a plane perpendicular to the main direction vector and determining a centre of said projection of the third point cloud.

10. The method of claim 1, wherein at least one point cloud among the first point cloud frames, the second point cloud frames and the third point cloud is determined by fusing at least two point clouds respectively acquired by at least two tridimensional sensors mounted on said vehicle.

11. The method of claim 1, further comprising determining a body frame coordinate system of the wheeled vehicle defined by the base point of the wheeled vehicle, and
at least one axis of the body frame coordinate system determined from the main direction vector and the instantaneous centre of rotation.

12. A method for registering a point cloud frame acquired by at least one tridimensional sensor mounted on a wheeled vehicle to a body frame coordinate system of the wheeled vehicle, said method comprising:
receiving a plurality of point cloud frames from said at least one tridimensional sensor, in a local coordinate system of said sensor,
retrieving a body frame coordinate system of the wheeled vehicle by performing a method according to claim 11 using said plurality of point cloud frames,
registering at least one point cloud frame acquired by said sensor in said local coordinate system of said sensor to said body frame coordinate system of the wheeled vehicle.

13. A self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor by operating a method according to claim 1.

14. An autonomous or semi-autonomous wheeled vehicle comprising a self-calibrating tridimensional sensor system according to claim 13.

15. A non-transitory computer readable storage medium, having stored thereon a computer program comprising program instructions, the computer program being loadable into a processing unit of a self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor,
the program instructions causing the processing unit to carry out the steps of a method according to claim 12, when the computer program is run by the processing unit.

16. A self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
register at least one of said point cloud frames to a body frame coordinate system of the wheeled vehicle by operating a method according to claim 11.

17. A non-transitory computer readable storage medium, having stored thereon a computer program comprising program instructions, the computer program being loadable into a processing unit of a self-calibrating tridimensional sensor system for a wheeled vehicle, the self-calibrating tridimensional sensor system comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor,
the program instructions causing the processing unit to carry out the steps of a method according to claim 1 when the computer program is run by the processing unit.

18. A self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor by operating a method according to claim 2.

19. A self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor by operating a method according to claim 3.

20. A self-calibrating tridimensional sensor system for a wheeled vehicle, comprising:
at least one tridimensional sensor adapted to be mounted on a wheeled vehicle to acquire point cloud frames of an environment of the vehicle and at least a portion of the vehicle,
a processing unit connected to said at least one tridimensional sensor and operational to
receive point cloud frames from said at least one tridimensional sensor, and
retrieve a location of a base point of a wheeled vehicle in a local coordinate system of the tridimensional sensor by operating a method according to claim 4.

* * * * *